United States Patent

Stevens

[15] 3,675,629
[45] July 11, 1972

[54] MINIMIZATION OF NITROGEN OXIDES IN COMBUSTION PRODUCTS

[72] Inventor: William D. Stevens, North Caldwell, N.J.

[73] Assignee: Foster Wheeler Corporation, Livingston, N.J.

[22] Filed: Sept. 28, 1970

[21] Appl. No.: 76,111

[52] U.S. Cl. .......................................... 122/235 R, 110/1 P
[51] Int. Cl. ................................................. F22b 21/00
[58] Field of Search .................... 110/72, 1 P; 122/235, 240; 431/10, 158

[56] References Cited

UNITED STATES PATENTS

| 3,228,451 | 1/1966 | Fraser et al. | 431/10 |
| 3,289,642 | 12/1966 | Schoppe | 122/240 |
| 2,927,632 | 3/1960 | Fraser | 431/158 |
| 3,048,131 | 8/1962 | Hardgrove | 110/72 |

*Primary Examiner*—Kenneth W. Sprague
*Attorney*—John Maier, III, Marvin A. Naigur and John E. Wilson

[57] ABSTRACT

Fluid which is heated in a furnace having several rows of burners is directed through tubes aligned in rows between the burner rows to minimize the concentration of nitrogen oxides in the combustion products.

8 Claims, 3 Drawing Figures

INVENTOR.
WILLIAM D. STEVENS
BY
John C. Wilson
ATTORNEY

MINIMIZATION OF NITROGEN OXIDES IN COMBUSTION PRODUCTS

BACKGROUND OF THE INVENTION

Recently, world interest has been focused on the problems created by pollution of the environment. It is generally considered that one of the most insidious forms of pollution is air pollution, most of which is caused by spewing into the atmosphere products of combustion. It is acknowledged generally that combustion products contain matter which is deleterious to health, unsightly, and harmful to vegetation, buildings and other property.

One class of pollutants which is found in combustion products and known to be undesirable from several standpoints is the gaseous group comprising the oxides of nitrogen. Both nitrogen and oxygen are present in the combustion air and will combine at high temperatures. It is known that the degree of formation of nitrogen oxides is a function of the temperature of the nitrogen and oxygen which react and the time the two gases are retained at high temperatures. The higher the temperature of the reacting gases, the higher will be the concentration of nitrogen oxides produced. Similarly, the longer the reacting gases are retained at elevated temperatures, the higher will be the concentrations of oxides of nitrogen.

SUMMARY OF THE INVENTION

It is an object of the present invention to overcome drawbacks found in the prior art, such as those discussed above. Accordingly, in a furnace wherein fuel is burned in several rows of burners to heat a fluid, fluid is made to pass in rows of tubes between the rows of burners to lower the temperature of gases in the vicinity of the burner flames, reduce the time that the gases are held at high temperatures and thereby reduce the concentration of oxides of nitrogen in the products of combustion.

DETAILED DESCRIPTION OF THE DRAWING

Figure 1:
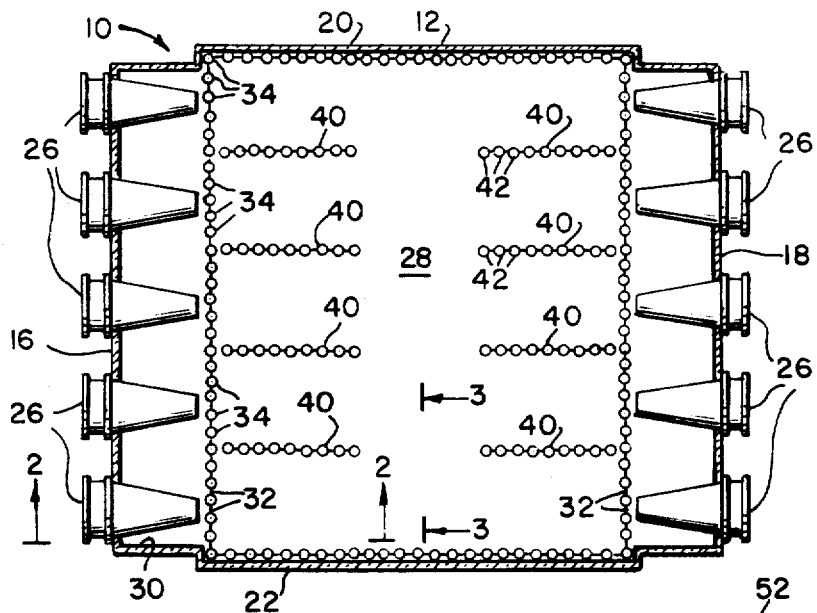
FIG. 1 is a plan view partly in section showing a furnace constructed in accordance with the present invention.
Figure 2:
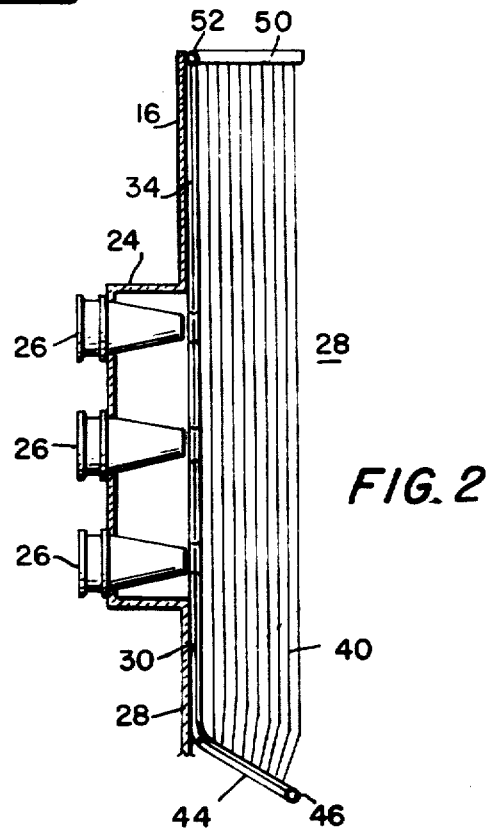
FIG. 2 is a fragmentary view taken substantially along the line 2—2 of FIG. 1.

In FIG. 1, a furnace 10 is shown with an outer wall 12. The outer wall 12 comprises side portions 16 and 18 and end portions 20 and 22. Each of the side portions 16 and 18 includes several burners which are arranged as shown in FIGS. 1 and 2. FIG. 2 shows only burners in the side wall 16 but it will be understood that the burners of side wall 18 are arranged in a similar fashion. As shown in FIG. 2, the side wall 16 has an outwardly projecting portion 24, in which burners 26 are arranged in vertical rows of three. The burners 26 mix fuel, such as oil or gas, with air and direct the mixture into the interior 28 of the furnace where the mixture is burned.

As shown best perhaps in FIG. 2, insulation 30 is positioned against the inner surface of the outer wall 12. Panels 32, comprising parallel tubes 34, are positioned within the insulation 30 to line the interior 28 of the furnace 12. The tubes are joined by fins in a conventional manner as shown in FIG. 1. Fluid is passed through the tubes 34, being introduced in the liquid phase and being transformed into the vapor phase because of the heat radiating against the tubes from the interior 28 of the furnace 12. The tubes line the sides and ends of the furnace 12 except at the openings 36 (FIG. 3), which are formed in the panels to allow the mixture of fuel and air to be projected from the burners 26 to the interior 28 of the furnace 12 where it burns.

Figure 3:
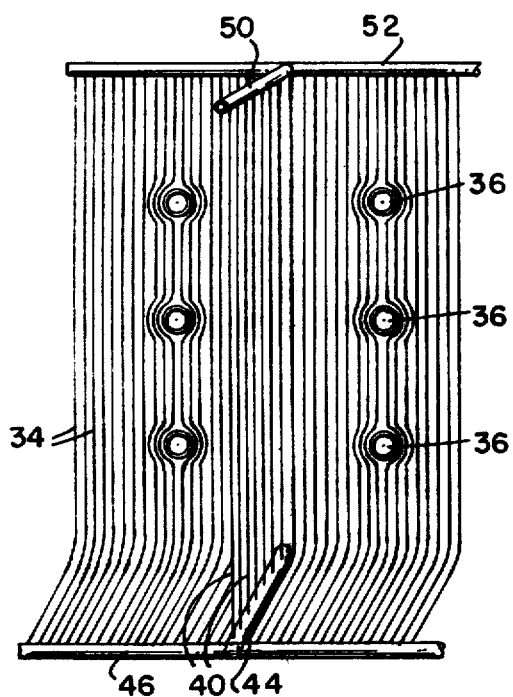
FIG. 3 is a fragmentary view partly in section taken substantially along the line 3—3 of FIG. 1.

It has already been explained that the concentration of oxides of nitrogen in the combustion gases can be decreased by lowering the temperatures of the combustion products and lengthening the time at which the products of combustion are held at elevated temperatures. To this end, between each vertical row of burners 26 is placed a partition wall 40 which is made up of parallel tubes 42 which are joined by fins in a manner similar to the tubes 34 of the panels 32. As shown in FIGS. 2 and 3, the bottoms of the tubes 42 are fed fluid by a header 44 which is joined to a header 46 which feeds fluid into the bottoms of the tubes 34 of the panels 32. Similarly, the tops of the tubes 42 communicate with a header 50 which is connected to a header 52 receiving fluid from the tops of the tubes 34. Thus, fluid will pass upwardly through the tubes 42 as well as the tubes 34.

Since fluid in the tubes 34 and 42 tends to cool the furnace whether the fluid passing through the tubes is in the form of liquid or vapor and since the partition walls 40 will cool the interior of the furnace, particularly at the location adjacent to the burners 26, the maximum temperature of gases within the furnace 12 will be less than if the partition walls were not present. This is so since the hottest locations within the furnace are normally areas adjacent to the burners and the interior walls where the fuel burns to form fire balls. In addition, there will be an increased temperature gradient from the center of the fire ball because of the proximity to it of the panels 40. Thus, products of combustion forming at the flames and moving out from them will be retained at elevated temperatures for a shorter time than if the partition walls 40 were not present. These conditions make for a reduction in the rate of formation of oxides of nitrogen.

The foregoing describes but one embodiment of the present invention. One of ordinary skill in the art will appreciate that modifications and other embodiments are possible and will not exceed the scope of the present invention as defined in the following claims.

What is claimed is:

1. A method of inhibiting the formation of oxides of nitrogen when fuel is burned in a furnace to heat a fluid, comprising the steps of:
   mixing the fuel with air and injecting the same into a furnace through a plurality of burners to burn in said furnace;
   passing the fluid through parallel straight tubes extending between the locations at which said fuel and air are moving when injected;
   said fluid being passed close enough to said burners and at a flow rate sufficient to lower the temperature to which said burning fuel rises to a point which will inhibit the formation of oxides of nitrogen.

2. The method defined in claim 1 wherein said tubes are parallel and in a plane generally parallel to the direction in which said fuel and air are moving when injected by said burners.

3. A furnace wherein tubes conduct fluid to be heated through said furnace, comprising:
   a plurality of burners for mixing fuel and air and directing said mixture into said furnace to be burned;
   said burners being arranged in rows;
   a plurality of said tubes extending between each of said rows of burners and being positioned to flow enough fluid close enough to said burners to limit the temperature of the combustion products at a point low enough to thereby inhibit the formation of oxides of nitrogen.

4. The structure defined in claim 3 wherein said tubes are generally parallel to said rows of burners and in planes parallel to the general direction in which said fuel is directed.

5. The structure defined in claim 3 wherein said tubes are joined by fins.

6. The structure defined in claim 5 wherein said furnace is substantially lined with tubes for directing the same fluid as is directed by said first defined tubes.

7. A furnace comprising:
   sidewalls lined with a plurality of parallel vertical sidewall tubes;

a plurality of burners for mixing fuel and air and directing said mixture into said furnace to be burned, said burners being arranged in vertical rows adjacent to said sidewalls; and a plurality of other parallel straight tubes extending in rows vertically between each pair of said rows of burners and arranged in planes so that when said burners are fired said planes will be between and parallel to the flames of said burners, said other tubes being positioned to limit the temperature of the combustion products to thereby inhibit the formation of oxides of nitrogen.

8. The furnace defined in claim 7 wherein the other tubes in said rows are joined by fins between adjacent other tubes.

* * * * *